3,267,644
PROCESS FOR DRYING VINYL CHLORIDE
Armin Jacobowsky, Knapsack, near Cologne, Germany, assignor to Knapsack Aktiengesellschaft, Knapsack, near Cologne, Germany, a corporation of Germany
Filed May 18, 1965, Ser. No. 459,522
5 Claims. (Cl. 55—33)

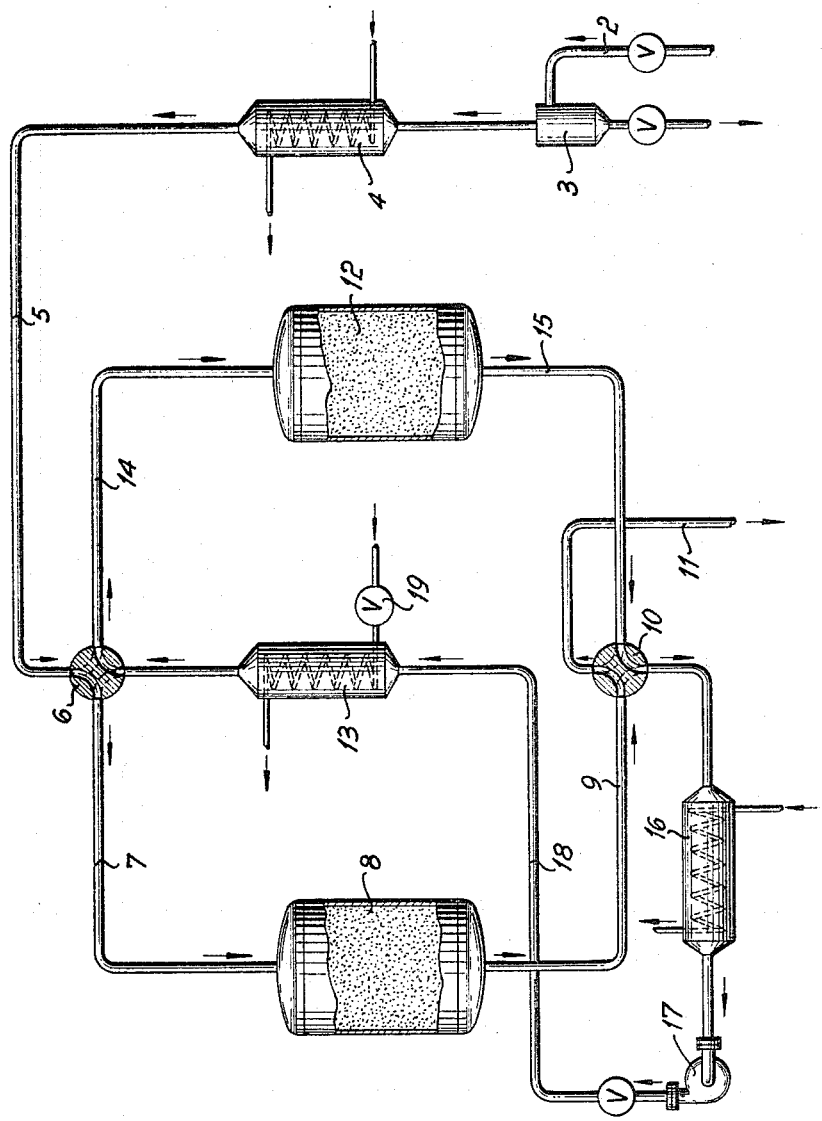

The application is a continuation-in-part application of application Serial No. 156,261, filed December 1, 1961, and now abandoned.

The present invention is concerned with a process for drying vinyl chloride and with an apparatus suitable for carrying out said process.

It is known that the large-scale production of vinyl chloride from acetylene and hydrogen chloride includes the formation of a moist, steam-saturated product at room temperature which is obtained after neutralization of the crude vinyl chloride and contains acetaldehyde and dichloroethane, and that this crude product must be dried before it is worked up.

Drying was carried out by known methods by passing the moist gas over solid drying agents, such as calcium chloride or alkali metal hydroxides. The drying agent, by the absorption of water, forms the corresponding liquor which cannot be regenerated, and is used up in amounts which vary with the water content of the vinyl chloride to be dried. This drying process took place in drying towers filled with the appropriate drying agent. Due to the formation of channels in the drying agent or due to the agglomeration thereof, it was often necessary prematurely to remove the fillings from the drying towers which involved additional consumption of the drying agents. When an alkali metal hydroxide was used as drying agent, the towers were sometimes even clogged by aldehyde resins covering the particulate drying agent.

The present invention is based on the unexpected observation that the afore-mentioned disadvantages can be avoided by passing, and thus drying, the vinyl chloride to be dried over silica gel and/or alumina gel. Advantageously, the vinyl chloride to be dried should contain at least about 5% by volume of one or more inert foreign gases. Inert gases which may be used are, for example, nitrogen or hydrocarbons, especially acetylene. The regeneration of the gel charged with water is carried out at temperatures between about 130° C.–about 200° C., preferably at 160°–180° C., and the gel, after having been cooled, again used in the drying process. Regeneration can take place by introducing or passing vinyl chloride preheated to an appropriate temperature over the water-laden gel.

Silica gel in particular is used, to a large extent, for drying industrial gases. Regarding the use of silica gel or alumina gel as regeneratable drying agent for vinyl chloride, which involves neither channel formation nor agglomeration, many technical objections were voiced by those skilled in the art, since it was felt that the vinyl chloride to be dried, or the aldehyde contained in the crude vinyl chloride, may polymerize or condense on the large surface and in the pores of the gel, which would result in these pores becoming clogged after a short time and thereby appreciably reduce the water absorbing capacity of the gel. This created a prejudice confirmed by U.S. Patent 3,132,186 which indicates that vinyl chloride undergoes dimerization or trimerization in the presence of a silicate at a temperature of 93°–260° C.

In laboratory tests, as well as in large-scale experiments, we have found that vinyl chloride can be dried very well and inexpensively when passed over silica and/or alumina gel, especially when the vinyl chloride to be dried contains more than 5% by volume of an inert gas.

An apparatus suitable for carrying out the process of the present invention is shown diagrammatically in the accompanying drawings.

The drying process is carried out, for example, in the following manner: neutralized, moist vinyl chloride is introduced through conduit 2 and conveyed through separator 3, precooler 4, conduit 5, four-way valve 6 and conduit 7 into the adsorber 8 which is filled with the drying agent. Here it is dried and removed from the drying apparatus through conduit 9, four-way valve 10 and discharge pipe 11. While adsorber 8 is in use, adsorber 12 is being regenerated. For this purpose vinyl chloride which has been previously introduced through line 5 and four-way valve 6 is passed through adsorber 12 and thence through line 15, four-way valve 10, cooler 16, blower 17 and heating chamber 13. The vinyl chloride is heated to 180° C. in the heating chamber 13. The heated vinyl chloride is passed through four-way valve 6 and conduit 14 into adsorber 12 charged with water and conveyed through conduit 15 and four-way valve 10 into cooler 16. The water adsorbed from the gel in adsorber 12 is condensed out and the vinyl chloride again introduced into heating chamber 13 through blower 17 and conduit 18. The vinyl chloride is cycled through adsorber 12 in the manner described above until an increase of temperature at the outlet of this adsorber 12 indicates the end of the activation. Subsequently, the supply of vapour heated to heating chamber 13 is automatically interrupted at 19 and the conducting of the vinyl chloride is continued until the regenerated adsorber 12 has been completely cooled. After a controlled period of time, four-way valves 6 and 10 are automatically changed into the second possible position (indicated in broken lines), whereupon the gas is dried in adsorber 12 while adsorber 8 is regenerated.

As compared with the drying agents hitherto used for drying vinyl chloride (e.g., calcium chloride and alkali metal hydroxides), the new process for drying vinyl chloride over silica gel or alumina gel shows many advantages:

(1) The drying agent may be regenerated and, therefore, can be used several times.

(2) No liquor is formed which would contaminate the waste liquor to an inadmissible extent.

(3) As compared with conventional processes, the drying effect is considerably improved.

(4) No obstruction of the drying towers by formation of aldehyde resins or the like occurs.

(5) The cost of the drying process being relatively low the manufacture of vinyl chloride is much more economical.

The following examples are given for the purpose of illustrating the present invention:

EXAMPLE 1

(*Laboratory test*)

Through a 100 cc. glass cylinder filled with silica gel (grain diameter about 1–2 mm.) were conveyed, per hour 50 litres (N.T.P.) crude vinyl chloride saturated with water at 20° C., consisting apart from water, of 90% by volume vinyl chloride, 5% by volume acetylene, 4% by volume nitrogen and 1% by volume acetaldehyde. After passing through the drying cylinder, the vinyl chloride had a residual moisture content not greater than 48 mg. water/Nm.$^3$. The drying of the vinyl chloride was interrupted after 4 hours and the silica gel was regenerated by the introduction of 20 liters (N.T.P.) vinyl chloride per hour, heated to 180° C. After regeneration, the gel was cooled for 1 hour with cold vinyl chloride and then used again for drying moist vinyl chloride.

After having been charged and regenerated 148 times, the gel did not show a reduced water-absorbing capacity.

The same result was obtained in a corresponding test using alumina gel.

EXAMPLE 2
*(Large-scale test)*

Through an adsorber of 1 cu. m. capacity filled with 800 kg. silica gel (grain diameter about 2–4 mm.) were conveyed, per hour, 1000 m.$^3$ (N.T.P.) crude vinyl chloride saturated with water at 24° C., consisting apart from water, of 94% by volume vinyl chloride, 3% by volume acetylene, 2% by volume nitrogen and 1% by volume acetaldehyde. After passing through the adsorber, the vinyl chloride had a residual moisture content of 62 mg. water/Nm.$^3$. The adsorber was charged after 6 hours with vinyl chloride heated to 185° C., the water adsorbed by the vinyl chloride during the passage through the adsorber eliminated in a series-connected condenser and the vinyl chloride again heated and cycled through adsorber, condenser and heating device until an increase of temperature (e.g., of 60° to 95° C.) at the outlet of the adsorber indicated its reactivation. After a subsequent 2 hours cooling of the adsorber, it was again used for drying moist vinyl chloride.

After the apparatus had been in use for 2000 hours, the water-absorbing capacity of the gel had not diminished nor had the differential pressure in the adsorber increased.

I claim:

1. A process of drying hydrous vinyl chloride in a continuous drying cycle comprising (i) contacting gaseous vinyl chloride containing water vapor with a drying agent selected from the group consisting of silica gel and aluminum gel and adsorbing the water vapor from the gaseous vinyl chloride to the drying agent, (ii) regenerating the drying agent now charged with water by contacting the drying agent with dry vinyl chloride at a temperature between about 130° C.–about 200° C., (iii) cooling the drying agent and (iv) using the cooled drying agent for drying gaseous vinyl chloride containing water vapor.

2. The process of claim 1 wherein the gaseous vinyl chloride containing water vapor in step (i) contains at least 5 percent by volume of inert gas.

3. The process of claim 2 wherein the inert gas is selected from the group consisting of hydrogen and hydrocarbons.

4. The process of claim 2 wherein the inert gas is acetylene.

5. The process of claim 1 wherein the dry vinyl chloride in step (ii) contacted with the drying agent charged with water is at a temperature of about 160°–180° C.

References Cited by the Examiner
UNITED STATES PATENTS

| | | | |
|---|---|---|---|
| 1,541,174 | 6/1925 | Ostromislensky | 260—656 |
| 2,535,902 | 12/1950 | Dailey | 55—33 |
| 3,065,280 | 11/1962 | Vogt | 260—654 |
| 3,132,186 | 5/1964 | Fleck et al. | 260—654 |

REUBEN FRIEDMAN, *Primary Examiner.*

C. N. HART, *Assistant Examiner.*